US012739260B2

(12) United States Patent
Marzorati et al.

(10) Patent No.: US 12,739,260 B2
(45) Date of Patent: Sep. 15, 2026

(54) VIRTUAL ENCAPSULATED INSTANCES FOR MITIGATION OF CYBERATTACKS

(71) Applicant: INTERNATIONAL BUSINESS MACHINES CORPORATION, Armonk, NY (US)

(72) Inventors: Mauro Marzorati, Lutz, FL (US); Paul Llamas Virgen, Guadalajara (MX); Pedro Mauricio Manjarrez Gutierrez, Guadalajara (MX); Karla Paulina Calderon Vaca, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/300,802

(22) Filed: Apr. 14, 2023

(65) Prior Publication Data

US 2024/0348626 A1 Oct. 17, 2024

(51) Int. Cl.
*G06F 7/04* (2006.01)
*G06F 21/53* (2013.01)
*H04L 9/40* (2022.01)

(52) U.S. Cl.
CPC .......... *H04L 63/1416* (2013.01); *G06F 21/53* (2013.01)

(58) Field of Classification Search
CPC ..... G06F 21/53; G06F 21/577; H04L 63/1416
See application file for complete search history.

(56) References Cited

U.S. PATENT DOCUMENTS 7,594,270 B2 9/2009 Church
9,253,206 B1 2/2016 Fleischman
(Continued)

FOREIGN PATENT DOCUMENTS

CN 106031118 B 10/2020
JP 5250594 B2 7/2013
JP 5853327 B2 2/2016

OTHER PUBLICATIONS

Hirono et al, Development of a Secure Traffic Analysis System to Trace Malicious Activities on Internal Networks, Jul. 25, 2014, IEEE, pp. 305-310. (Year: 2014).*
(Continued)

*Primary Examiner* — Philip J Chea
*Assistant Examiner* — Jenise E Jackson
(74) *Attorney, Agent, or Firm* — Samuel A. Waldbaum

(57) ABSTRACT

According to one embodiment, a method, computer system, and computer program product for mitigating cyberattacks is provided. The present invention may include responding to a verification of a detected attack on a system, by detecting one or more modifications to one or more software components made by malicious network traffic; identifying the malicious network traffic; determining one or more compromised software components based on the detected one or more modifications and the identified malicious network traffic; performing digital twin simulation to evaluate one or more risks associated with the one or more compromised software components in order to identify the one or more software components to encapsulate; creating an encapsulated environment; provisioning the one or more software components to encapsulate to the encapsulated environment; and redirecting the malicious network traffic to the encapsulated environment.

20 Claims, 4 Drawing Sheets

(56) References Cited

U.S. PATENT DOCUMENTS

| | | | | |
|---|---|---|---|---|
| 9,398,043 | B1 * | 7/2016 | Yang | H04L 63/1441 |
| 10,095,866 | B2 | 10/2018 | Gong | |
| 10,277,612 | B2 | 4/2019 | Marzorati | |
| 10,567,441 | B2 | 2/2020 | Nainar | |
| 10,579,403 | B2 | 3/2020 | Antony | |
| 10,674,719 | B2 | 6/2020 | Baughman | |
| 10,791,132 | B1 * | 9/2020 | Power | H04L 63/0428 |
| 2010/0138920 | A1 * | 6/2010 | Kim | H04L 63/1416<br>726/22 |
| 2017/0093888 | A1 | 3/2017 | Marzorati | |
| 2018/0260574 | A1 | 9/2018 | Morello | |
| 2019/0222612 | A1 * | 7/2019 | Nainar | H04L 12/4633 |
| 2019/0246626 | A1 | 8/2019 | Baughman | |
| 2020/0389469 | A1 | 12/2020 | Litichever | |
| 2021/0328977 | A1 * | 10/2021 | Luo | H04L 63/126 |
| 2022/0141194 | A1 | 5/2022 | Xiao | |

OTHER PUBLICATIONS

Bhayo et al, A Time-Efficient Approach Toward DDOS Attack Detection in IoT Network Using SDN, Jul. 19, 2021, IEEE, pp. 3612-3630. (Year: 2021).*

Vrable, et al., "Scalability, fidelity, and containment in the potemkin virtual honeyfarm," ACM SIGOPS Operating Systems Review [article], Dec. 2005, pp. 148-162, vol. 39, Issue 5, Retrieved from the Internet: <URL: https://doi.org/10.1145/1095809.1095825>.

Wang, "A cyber-security defense method using Docker containers," Vanderbilt University Intuitional Repository [thesis], May 2015, 25 pages, Retrieved from the Internet: <URL: https://ir.vanderbilt.edu/handle/1803/11128>.

* cited by examiner

VIRTUAL ENCAPSULATED INSTANCES FOR MITIGATION OF CYBERATTACKS

BACKGROUND

The present invention relates, generally, to the field of computing, and more particularly to cybersecurity.

Cybersecurity is a technological practice by which critical systems and sensitive information is protected from digital attacks. Cybersecurity technologies involve measures designed to combat threats against networked systems and applications, whether those threats originate from inside or outside of an organization. Currently, cybersecurity methods can identify a cyberattack and implement countermeasures after the detection of an attack. However, in order for cybersecurity to ensure the protection of data during a cyberattack, a method and system by which malicious traffic behavior is identified, an isolated encapsulated instance(s) is created in an encapsulated environment, and the malicious traffic behavior is redirected to the isolated encapsulated instance(s) without alerting the hacker, are needed. Thus, an improvement in cybersecurity has the potential to minimize the consequences of an attack on a system by a hacker, thus, benefitting hybrid cloud users.

SUMMARY

According to one embodiment, a method, computer system, and computer program product for mitigating cyberattacks is provided. The present invention may include responding to a verification of a detected attack on a system, by detecting one or more modifications to one or more software components made by malicious network traffic; identifying the malicious network traffic; determining one or more compromised software components based on the detected one or more modifications and the identified malicious network traffic; performing digital twin simulation to evaluate one or more risks associated with the one or more compromised software components in order to identify the one or more software components to encapsulate; creating an encapsulated environment; provisioning the one or more software components to encapsulate to the encapsulated environment; and redirecting the malicious network traffic to the encapsulated environment.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
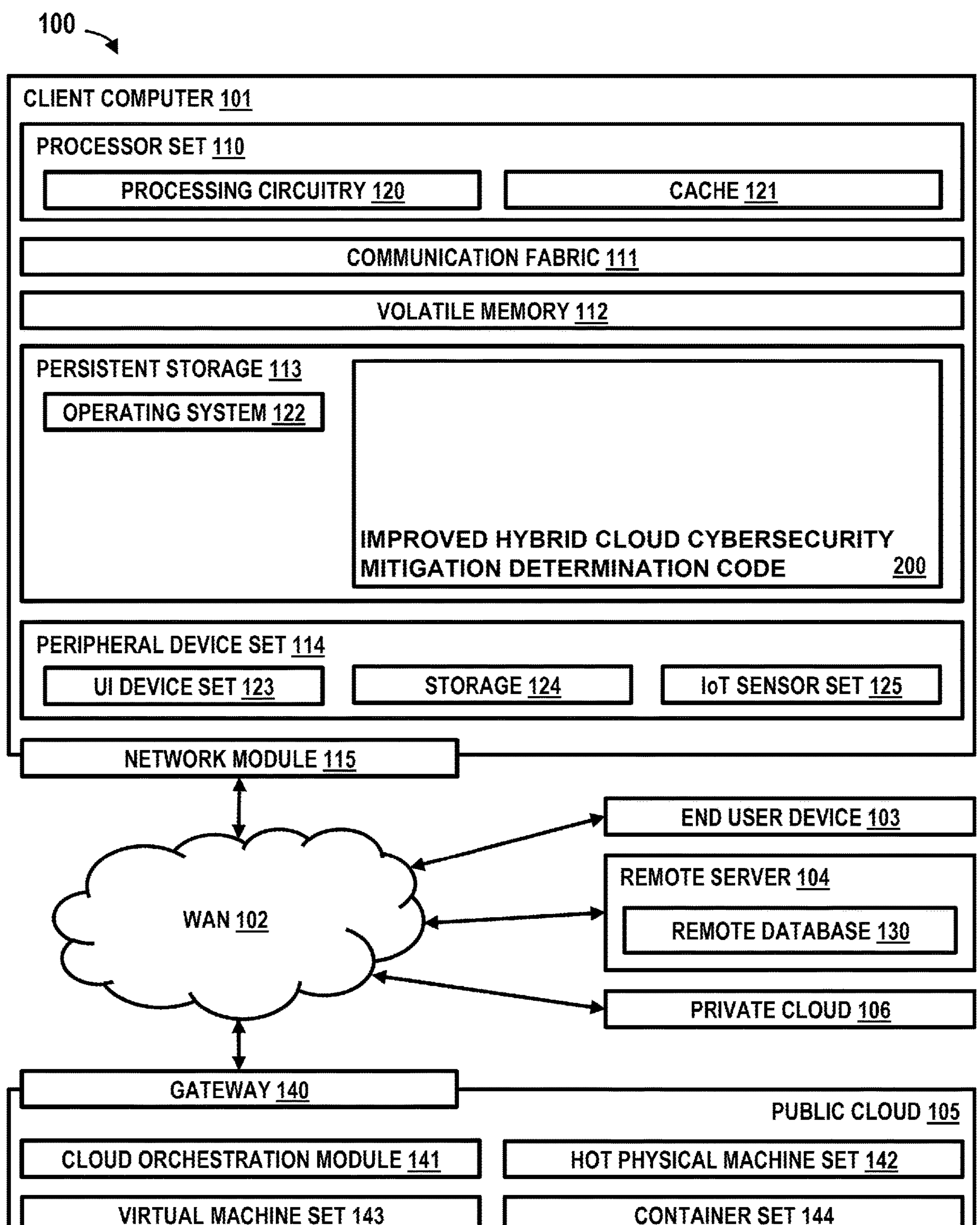
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

In cybersecurity, critical systems and sensitive information are protected from cyberattacks. Cyberattacks represent a serious threat to continuous service delivery and data integrity because a hacker may alter delete, corrupt, or havoc a system. Once the damage from a hacker is done, it may take a longer period to recover the data, or the data might even be permanently lost. The ability of a system to be able to identify when it is being attacked and dynamically deploy countermeasures to keep all data secure is a necessity in today's world. Therefore, it may be likely that cybersecurity is limited because of the inability to dynamically deploy countermeasures to secure data during a cyberattack.

One way in which current methods attempt to address problems with cybersecurity is by using methods known as honeypots and canaries. However, several deficiencies exist with these current methods. Honeypots is a concept where an attractive system for an attack to exploit is created and the problems of the attractive system are analyzed after the attacker exploits the system. One of the deficiencies of using honeypots is that honeypots are used as a proactive method, meaning honeypots do not minimize the consequences of an attack by a hacker but rather only provoke an attacker to exploit a given system. Canaries are designed to alert a user of intruders and reduce the time required to identify a breach. One of the deficiencies of using canaries is that canaries are like trip wires, any activity is declared malignant by definition because benign traffic is not meant to be directed to a canary. Thus, an improvement in cybersecurity has the potential to minimize the consequences of an attack on a system by a hacker, thus, benefitting hybrid cloud users.

The present invention has the capacity to improve cybersecurity by dynamically mitigating cyberattacks on a system. The present invention can generate hybrid cloud instances in an encapsulated environment to protect the production environment of a system. The present invention can be deployed on demand and can corral the suspected traffic to an isolated subset of the hybrid cloud environment. The present invention can continue running the networked computing environment, also referred to as "the system", without being affected further by an attack by encapsulating a replica of itself after a vulnerability is detected. This improvement in cybersecurity can be accomplished by implementing a system that responds to a verification of a detected attack on a system, by detecting one or more modifications to one or more software components made by malicious network traffic, identifies the malicious network traffic, determines one or more compromised software components based on the detected one or more modifications and the identified malicious network traffic, performs digital twin simulation to evaluate one or more risks associated with the one or more compromised software components in order to identify the one or more software components to encapsulate, creates an encapsulated environment, provisions the one or more software components to encapsulate to the encapsulated environment, and redirects the malicious network traffic to the encapsulated environment.

In some embodiments of the invention, the hybrid cloud cyberattack mitigation determination program, herein referred to as "the program", can create a plurality of micro instances in a networked computing environment, also referred to as "the system". The program can automatically and dynamically be deployed in response to a verification of a detected attack on the networked computer environment. The program can detect modifications, made by malicious network traffic, to one or more software components within the networked computer environment. The program can detect modifications made to the software components of the networked computer environment by gathering information about the system's code, such as code repositories, a database's data integrity, filesystems, docket components, specific services, storage, file checking, logs, etc. Specifically, the program can detect any modifications made to the software components of the system from malicious activity based on discordances in the gathered information comparing the software components in a state existing before the attack, to the software components in their current state during the attack using data storage methods, such as snapshots or backups.

The program can identify the malicious network traffic. The program can identify malicious network traffic by identifying the data sources, including any endpoint(s), on the network and uncovering the attacking device(s) traversing the network. The network traffic may be identified using a network topology mapper, in addition to other methods such as availability monitoring, configuration monitoring, performance monitoring, cloud infrastructure monitoring, etc. The program can unify the data from various network data sources to obtain visibility. The core data sources for network monitoring may comprise packet data, flow data, WIFI data, and device data. The program can uncover the attacking device(s) traversing the network by using a network topology mapper.

The program may apply process migrating, load-balancing strategies, and/or other such orchestration methods, to migrate normal network traffic away from malicious network traffic. The program may migrate the designated normal network traffic away, using repulsion or avoidance concepts. The program may set up new facilities within the networked computer environment and can migrate the designated normal network traffic to the new facilities, leaving behind the malicious network traffic in the process. The program can deploy a containment structure and can wrap the left-behind malicious network traffic in the containment structure.

In addition, in some embodiments of the invention, deploying the containment structure may comprise taking a snapshot of designated data, allowing it to be restored later, preventing writings from external devices on designated data, and/or using the designated data to simulate software component risks, such as component failure.

In some embodiments of the invention, such as when the suspected malicious network traffic is being acted on, the program may additionally employ an attraction strategy in its application process migrating, load-balancing strategies, and/or other such orchestration methods, to attract malicious network traffic workflows to a purpose-deployed facility, where containment can be more easily deployed.

The program can determine the compromised software component(s) based on the detected modifications and the identified malicious network traffic. The program can determine the compromised software component(s) based on the location(s) of the detected modification(s) made by the attacking device(s). More specifically, the program can identify the software component(s) that were affected by the identified malicious traffic.

The program can perform digital twin simulation to evaluate the risk(s) associated with each compromised software component(s) in order to identify software component (s) to encapsulate. The program can perform a digital twin simulation to analyze the identified risks associated with the one or more software components in the system. The digital twin simulation can reproduce the system comprising the malicious network traffic from the attacking device(s). The digital twin can simulate the production environment comprising the malicious network traffic to estimate the effect of the identified risks associated with each of the software components. The digital twin can use the gathered data to surmise whether a software component requires encapsulation based on the effects of the evaluated identified risks of the software component. The digital twin may group the software components into one group comprising software components that require encapsulation and another group comprising software components not requiring encapsulation.

The program can dynamically redirect malicious network traffic to an encapsulated environment by creating virtual proxy magnets on demand. The virtual proxy magnet may be used to handle the malicious network traffic in the containment structure and redirect the malicious network traffic in the containment structure to the encapsulated environment created by the program. Once the malicious network traffic has been redirected to the encapsulated environment, the encapsulated environment may continue processing and can respond to the actions of the attacking device, based on the commands of the attacking device. The attacking device's actions can only modify the system's virtual software components in the encapsulated environment. The program can display the encapsulated environment to the attacking device and can communicate any modifications made to the virtual software component in the encapsulated environment to the attacking device. Additionally, the program may roll back/reverse any modifications enacted to one or more compromised software components within the networked computer environment from the moment the malicious traffic was detected, by using data storage methods, such as snapshots or backups.

The program can create an encapsulated environment to mimic a virtual computing environment. An encapsulated environment may be a virtual isolated replica of the networked computer environment, used to deploy vulnerable software component(s) without compromising the actual networked computer environment. The encapsulated environment may intentionally compromise software capability (ies) and may reroute malicious traffic through a proposed proxy to trick attackers. The program can create the encapsulated environment on the hybrid cloud network. The encapsulated environment may comprise an isolated network configuration. Additionally, the encapsulated environment may comprise the same attributes and characteristics required to operate the encapsulated software components as the software component(s) within the networked computer environment. The program can provision the software component(s) to encapsulate, to an encapsulated environment. The program may provision the identified one or more software components to an encapsulated environment using containerization or using machine virtualization techniques, such as logical partition (LPAR), dynamic logical partitioning (DLPAR), workload partitioning (WPAR), etc.

An exemplary use of the invention may involve a research center performing critical, resource-demanding processes. Often, these processes require a long time to be completed. During the running of one such process, an unauthorized user breaks into the research center's system to interrupt the process. The moment the break-in occurs, the system detects and verifies the break-in. The system generates an encapsulated instance in a virtual environment and defers the malicious traffic from the unauthorized user to the encapsulated instance. Thus, the research center's process won't be affected by the actions of the unauthorized user even if the virtual environment were destroyed.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product that responds to a verification of a detected attack on a system, by detecting one or more modifications to one or more software components made by malicious network traffic, identifies the malicious network traffic, determines one or more compromised software components based on the detected one or more modifications and the identified malicious network traffic, performs digital twin simulation to evaluate one or more risks associated with the one or more compromised software components in order to identify the one or more software components to encapsulate, creates an encapsulated environment, provisions the one or more software components to encapsulate to the encapsulated environment, and redirects the malicious network traffic to the encapsulated environment.

Referring to FIG. 1, an exemplary networked computer environment 100 is depicted, according to at least one embodiment. Computing environment 100 contains an example of an environment for the execution of at least some of the computer code involved in performing the inventive methods, such as improved hybrid cloud cyberattack mitigation determination code 200. In addition to code block 200 computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
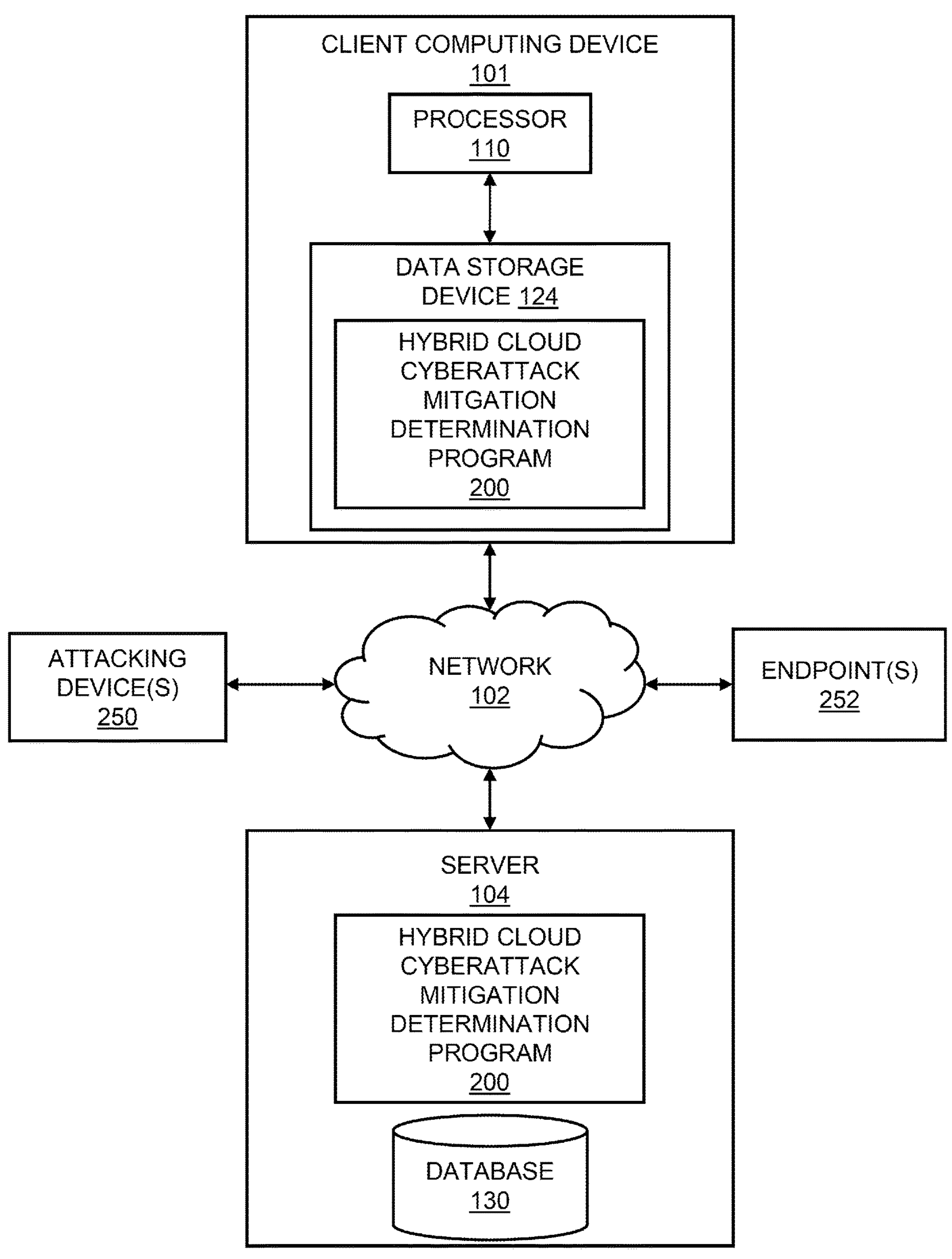
FIG. 2 illustrates an exemplary application invention environment according to at least one embodiment.

Referring to FIG. 2, an exemplary application environment is depicted, according to at least one embodiment. FIG. 2 may include client computing device 101 and a remote server 104 interconnected via a communication network 102. According to at least one implementation, FIG. 2 may include a plurality of client computing devices 101 and remote servers 104, of which only one of each is shown for illustrative brevity. It may be appreciated that FIG. 2 provides only an illustration of one implementation and does not imply any limitations with regard to the environments in which different embodiments may be implemented. Many modifications to the depicted environments may be made based on design and implementation requirements.

Client computing device 101 may include a processor 110 and a data storage device 124 that is enabled to host and run a hybrid cloud cyberattack mitigation determination program 200 and communicate with the remote server 104 via the communication network 102, in accordance with one embodiment of the invention.

The remote server computer 104 may be a laptop computer, netbook computer, personal computer (PC), a desktop computer, or any programmable electronic device or any network of programmable electronic devices capable of hosting and running a hybrid cloud cyberattack mitigation determination program 200 and a database 130 and communicating with the client computing device 101 via the communication network 102, in accordance with embodiments of the invention. The remote server 104 may also operate in a cloud computing service model, such as Software as a Service (SaaS), Platform as a Service (PaaS), or Infrastructure as a Service (IaaS). The remote server 104 may also be located in a cloud computing deployment model, such as a private cloud, community cloud, public cloud, or hybrid cloud.

The database 130 may be a digital repository capable of data storage and data retrieval. The database 130 can be present in the remote server 104 and/or any other location in the network 102.

Attacking device 250 may be any remote computing device that is communicating malicious network traffic to the network 102. An attacking device 250 may comprise applications, devices, users, VPNs, interfaces, etc. running on the network 102. Additionally, an attacking device 250 may comprise any device that can allow a user and/or system to access and/or modify software components within the networked computer environment 100.

Endpoint(s) 252 may be any remote computing device that is communicating normal/safe network traffic to the network 102. An endpoint may comprise applications, devices, users, VPNs, interfaces, etc.

According to the present embodiment, the hybrid cloud cyberattack mitigation determination program 200 herein referred to as "the program", may be a program capable of detecting modifications, made by malicious network traffic, to one or more software components of the system, identifying the malicious network traffic, determining the compromised software component(s) based on the detected modifications and the identified malicious network traffic, performing digital twin simulation to evaluate the risk(s) associated with each compromised software component(s) in order to identify software component(s) to encapsulate, creating an encapsulated environment, provisioning the software component(s) to encapsulate to an encapsulated environment, and redirecting the malicious network traffic to the encapsulated environment. The program 200 may be located on client computing device 101 or remote server 104 or on any other device located within network 102. Furthermore, the program 200 may be distributed in its operation over multiple devices, such as client computing device 101 and remote server 104. The hybrid cloud cyberattack mitigation determination method is explained in further detail below with respect to FIG. 3.

Figure 3:
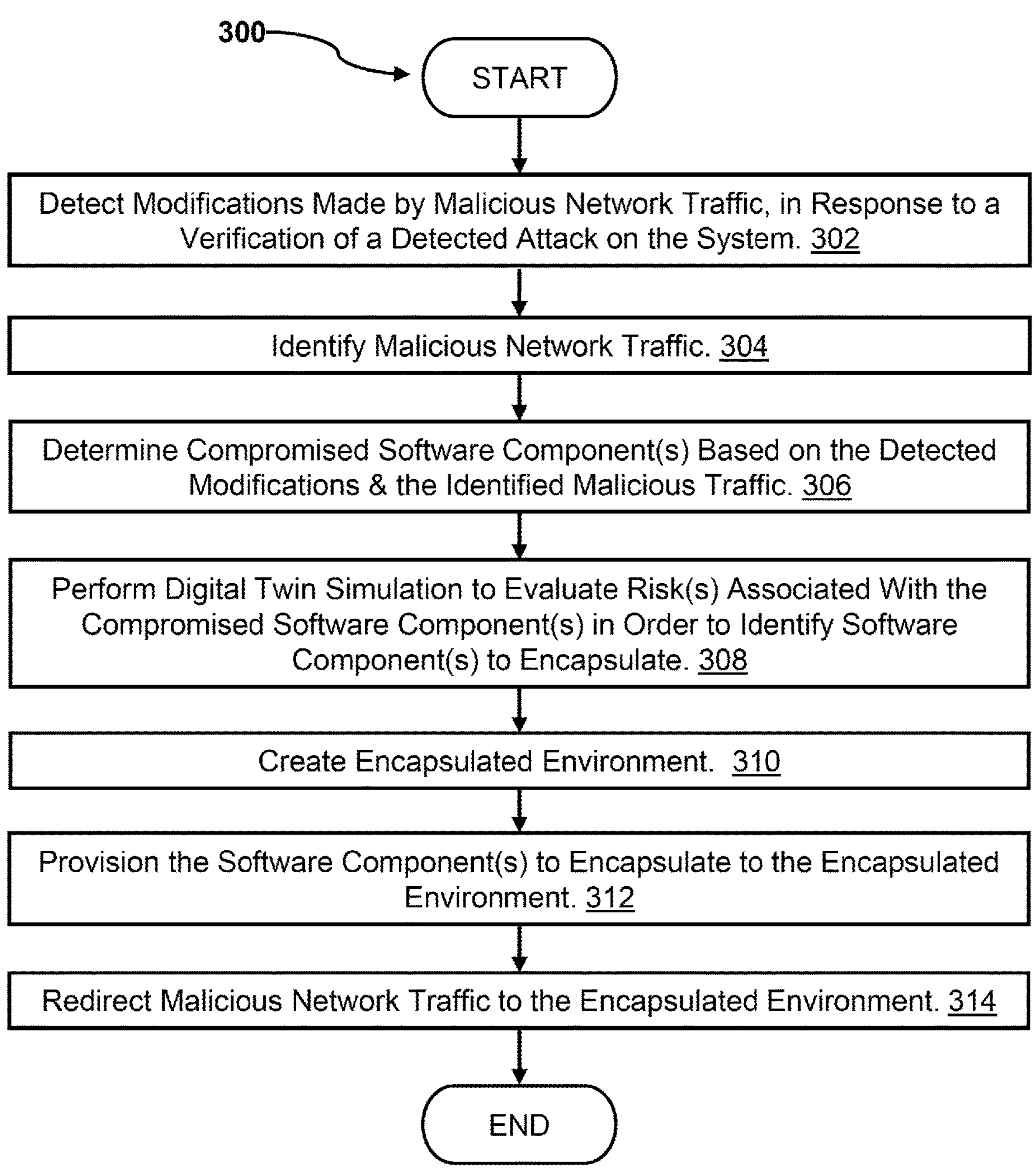
FIG. 3 is an operational flowchart illustrating a hybrid cloud cyberattack mitigation determination process according to at least one embodiment.

Referring now to FIG. 3, an operational flowchart illustrating a hybrid cloud cyberattack mitigation determination process 300 is depicted according to at least one embodiment. The program 200 can automatically and dynamically be deployed in response to a verification of a detected attack on the networked computer environment 100, also referred to as "the system". At 302, the program 200 detects modifications, made by malicious network traffic, to one or more software components within the networked computer environment 100. Software components may comprise application programs, device drivers, operating systems, and root-user processes, within the networked computer environment 100. The program 200 can detect modifications made to the software components of the networked computer environment 100 by gathering information about the system's 100 code, such as code repositories, a database's data integrity, filesystems, docket components, specific services, storage, file checking, logs, etc. Specifically, the program 200 can detect any modifications made to the software components of the system 100 from malicious activity based on discordances in the gathered information comparing the software components in a state existing before the attack, to the software components in their current state during the attack using data storage methods, such as snapshots or backups.

At 304, the program can identify the malicious network traffic. The program 200 can identify malicious network traffic by identifying the data sources, including any endpoint(s) 252, on the network 102 and uncovering the attacking device(s) 250 traversing the network 102. The network traffic may be identified using a network topology mapper, in addition to other methods such as availability monitoring, configuration monitoring, performance monitoring, cloud infrastructure monitoring, etc. The program 200 can unify the data from various network data sources to obtain visibility. The core data sources for network monitoring may comprise packet data, flow data, WIFI data, and device data. The program 200 can uncover the attacking device(s) 250 traversing the network 102 by using a network topology mapper.

The program 200 may apply process migrating, load-balancing strategies, and/or other such orchestration methods, to migrate normal network traffic away from malicious network traffic. The program 200 may migrate the designated normal network traffic away, using repulsion or avoidance concepts. Normal network traffic may comprise all network traffic that the program 200 designates as safe and normal from endpoints 252 on the network 102. Network traffic that is not identified as designated normal network traffic network activity or is detected to be from the attacking device(s) 250, may be designated as malicious network traffic. The program 200 may set up new facilities within the networked computer environment 100 and can migrate the designated normal network traffic to the new facilities, leaving behind the malicious network traffic in the process. The program 200 can deploy a containment structure and can wrap the left-behind malicious network traffic in the containment structure. In addition, in some embodiments of the invention, deploying the containment structure may comprise taking a snapshot of designated data, allowing it to be restored later, preventing writings from external devices on designated data, and/or using the designated data to simulate software component risks, such as component failure. In some embodiments of the invention, such as when the suspected malicious network traffic is being acted on, the program 200 may additionally employ an attraction strategy in its application process migrating, load-balancing strategies, and/or other such orchestration methods, to attract malicious network traffic workflows to a purpose-deployed facility, where containment can be more easily deployed.

At 306, the program 200 determines the compromised software component(s) based on the detected modifications and the identified malicious network traffic. The program 200 can determine the compromised software component(s) based on the location(s) of the detected modification(s) made by the attacking device(s) 250. More specifically, the program 200 can identify the software component(s) that were affected by the identified malicious traffic.

At 308, the program 200 performs digital twin simulation to evaluate the risk(s) associated with each compromised software component(s) in order to identify software component(s) to encapsulate. A digital twin simulation can be a virtual representation of an object or system and is updated from real-time data and may use simulations to help decision-making. Digital twin simulation may be performed using artificial intelligence systems such as Maximo® (Maximo® and all Maximo®-based trademarks and logos are trademarks or registered trademarks of International Business Machines Corporation, and/or its affiliates). Risks can comprise modifications made to the software components within the networked computer environment 100 that may result in harmful modifications to the system 100, such as critical failures in production, performance issues, security breaches, risks across user transactions, data deletion, data corruption, file loss, unwanted data movement, unwanted access, etc. The program 200 can perform a digital twin simulation to analyze the identified risks associated with the one or more software components in the system 100. The digital twin simulation can reproduce the system 100 comprising the malicious network traffic from the attacking device(s) 250. The digital twin can simulate the production environment comprising the malicious network traffic to estimate the effect of the identified risks associated with each of the software components. The digital twin can use the gathered data to surmise whether a software component requires encapsulation based on the effects of the evaluated identified risks of the software component. The digital twin may group the software components into one group comprising software components that require encapsulation and another group comprising software components not requiring encapsulation.

At 308, the program 200 creates an encapsulated environment. An encapsulated environment may be a virtual isolated replica of the networked computer environment 100, used to deploy vulnerable software component(s) without compromising the actual networked computer environment 100. The encapsulated environment may intentionally compromise software capability(ies) and may reroute malicious traffic through a proposed proxy to trick attackers. The encapsulated environment may be created on the hybrid cloud network 102. The encapsulated environment may comprise an isolated network configuration. Additionally, the encapsulated environment may comprise the same attributes and characteristics required to operate the encapsulated software components as the software component(s) within the networked computer environment 100.

At 312, the program 200 provisions the software component(s) to encapsulate to an encapsulated environment. The program 200 may provision the identified one or more software components to an encapsulated environment using containerization or using machine virtualization techniques, such as logical partition (LPAR), dynamic logical partitioning (DLPAR), workload partitioning (WPAR), etc. Machine virtualization techniques may be performed using virtual machine systems such as IBM z/VM® (IBM z/VM® and all IBM z/VM®-based trademarks and logos are trademarks or registered trademarks of International Business Machines Corporation, and/or its affiliates). Containerization may be performed using cloud systems such as IBM Cloud Paks® and/or Red Hat® OpenShift® Container Platform (IBM Cloud Paks® and Red Hat® OpenShift® and all IBM Cloud Paks® and Red Hat® OpenShift®-based trademarks and logos are trademarks or registered trademarks of International Business Machines Corporation, and/or its affiliates).

At 314, the program 200 redirects the malicious network traffic to the encapsulated environment. The program 200 can redirect malicious network traffic to the encapsulated environment by creating a virtual proxy magnet for traffic redirection. The virtual proxy magnet may be used to handle the malicious network traffic in the containment structure and redirect the malicious network traffic in the containment structure to the encapsulated environment created by the program 200.

Once the malicious network traffic has been redirected to the encapsulated environment, the encapsulated environment may continue processing and can respond to the actions of the attacking device 250, for example, by deleting data from the virtual database in the encapsulated environment based on the commands of the attacking device 250. The attacking device's 250 actions can only modify the system's 100 virtual software components in the encapsulated environment. The program 200 can display the encapsulated environment to the attacking device 250 and can communicate any modifications made to the virtual software component in the encapsulated environment to the attacking device 250. For example, an internal hacker might break into a bank's transaction systems in an attempt to send monetary deposits to a third party's account. Once the danger is identified by the system 100, the transactions continue, and the hacker sees the balances being updated accordingly. However, all of the activity between the internal hacker and the system 100 occurs in the encapsulated environment and keeps the balances of the real accounts on the bank's transaction systems unaffected. Additionally, the program 200 can roll back/reverse any modifications enacted to one or more compromised software components within the networked computer environment 100 from the moment the malicious traffic was detected, by using data storage methods, such as snapshots or backups.

Figure 4:
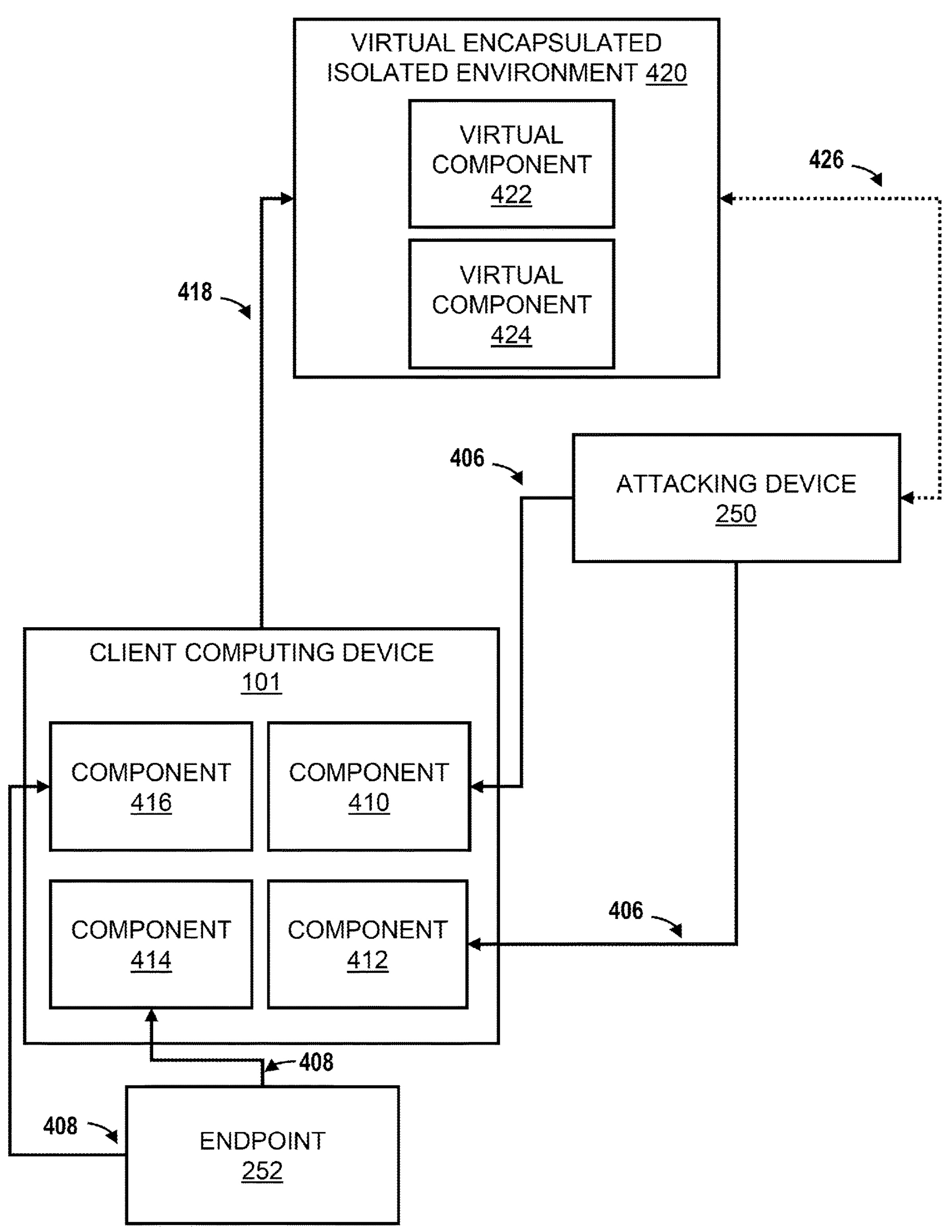
FIG. 4 depicts a visual representation of a hybrid cloud cyberattack mitigation determination process according to at least one embodiment.

Referring now to FIG. 4, a visual representation of a hybrid cloud cyberattack mitigation determination process 300 is depicted according to at least one embodiment. Here, an attacking device 250 is shown sending malicious network traffic 406 to components 410, 412 in a client computing device 101. An endpoint 252 is shown sending designated normal network traffic 408 to components 414, 416 in the client computing device 101. In response to the program 200 detecting malicious network traffic 406, a virtual encapsulated isolated environment 420 can be created and is shown, comprising virtual components 422, 424. Virtual components 422, 424 can comprise virtual copies of components 410, 412 respectively, and can be provisioned 418 to the virtual encapsulated isolated environment 420 from the client computing device 101, as shown. Also depicted is the redirected malicious networking traffic 426 between the attacking device 250 and the virtual encapsulated isolated environment 420.

It may be appreciated that FIGS. 2 through 4 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for mitigating cyberattacks, the method comprising:

responding to a verification of a detected attack on a system, by detecting one or more modifications to one or more software components made by malicious network traffic;

identifying the malicious network traffic;

determining one or more compromised software components based on the detected one or more modifications and the identified malicious network traffic;

performing digital twin simulation to evaluate one or more risks associated with the one or more compromised software components in order to identify the one or more software components to encapsulate;

creating an encapsulated environment;

provisioning the one or more software components to encapsulate to the encapsulated environment; and redirecting the malicious network traffic to the encapsulated environment.

2. The method of claim 1, further comprising:

continuing to process and respond to the detected attack in the encapsulated environment.

3. The method of claim 1, wherein the redirecting of the malicious network traffic to the encapsulated environment is performed by creating a virtual proxy magnet.

4. The method of claim 1, wherein the detecting of the one or more modifications to the one or more software components made by the malicious network traffic and the identifying the malicious network traffic, occur concurrently.

5. The method of claim 1, wherein the performing of the digital twin simulation to evaluate the one or more risks associated with the one or more compromised software components in order to identify the one or more software components to encapsulate and the creating of the encapsulated environment, occur concurrently.

6. The method of claim 1, wherein the creating of the encapsulated environment comprises an isolated network configuration, and wherein the encapsulated environment maintains same attributes and characteristics required to dynamically operate as it does on the system.

7. The method of claim 1, further comprising:

continuing to process the system.

8. A computer system for mitigating cyberattacks, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

responding to a verification of a detected attack on a system, by detecting one or more modifications to one or more software components made by malicious network traffic;

identifying the malicious network traffic;

determining one or more compromised software components based on the detected one or more modifications and the identified malicious network traffic;

performing digital twin simulation to evaluate one or more risks associated with the one or more compromised software components in order to identify the one or more software components to encapsulate;

creating an encapsulated environment;

provisioning the one or more software components to encapsulate to the encapsulated environment; and redirecting the malicious network traffic to the encapsulated environment.

9. The computer system of claim 8, further comprising:

continuing to process and respond to the detected attack in the encapsulated environment.

10. The computer system of claim 8, wherein the redirecting of the malicious network traffic to the encapsulated environment is performed by creating a virtual proxy magnet.

11. The computer system of claim 8, wherein the detecting of the one or more modifications to the one or more software components made by the malicious network traffic and the identifying the malicious network traffic, occur concurrently.

12. The computer system of claim 8, wherein the performing of the digital twin simulation to evaluate the one or more risks associated with the one or more compromised software components in order to identify the one or more software components to encapsulate and the creating of the encapsulated environment, occur concurrently.

13. The computer system of claim 8, wherein the creating of the encapsulated environment comprises an isolated network configuration, and wherein the encapsulated environment maintains same attributes and characteristics required to dynamically operate as it does on the system.

14. The computer system of claim 8, further comprising:

continuing to process the system.

15. A computer program product for mitigating cyberattacks, the computer program product comprising:

one or more computer-readable tangible storage medium and program instructions stored on at least one of the one or more tangible storage medium, the program instructions executable by a processor to cause the processor to perform a method comprising:

responding to a verification of a detected attack on a system, by detecting one or more modifications to one or more software components made by malicious network traffic;

identifying the malicious network traffic;

determining one or more compromised software components based on the detected one or more modifications and the identified malicious network traffic;

performing digital twin simulation to evaluate one or more risks associated with the one or more compromised software components in order to identify the one or more software components to encapsulate;

creating an encapsulated environment;

provisioning the one or more software components to encapsulate to the encapsulated environment; and redirecting the malicious network traffic to the encapsulated environment.

16. The computer program product of claim 15, further comprising:

continuing to process and respond to the detected attack in the encapsulated environment.

17. The computer program product of claim 15, wherein the redirecting of the malicious network traffic to the encapsulated environment is performed by creating a virtual proxy magnet.

18. The computer program product of claim 15, wherein the detecting of the one or more modifications to the one or more software components made by the malicious network traffic and the identifying the malicious network traffic, occur concurrently.

19. The computer program product of claim 15, wherein the performing of the digital twin simulation to evaluate the one or more risks associated with the one or more compromised software components in order to identify the one or more software components to encapsulate and the creating of the encapsulated environment, occur concurrently.

20. The computer program product of claim 15, wherein the creating of the encapsulated environment comprises an isolated network configuration, and wherein the encapsulated environment maintains same attributes and characteristics required to dynamically operate as it does on the system.

* * * * *